United States Patent
Niu et al.

(10) Patent No.: US 8,274,519 B2
(45) Date of Patent: Sep. 25, 2012

(54) MEMORY ACCESS SYSTEM AND METHOD FOR EFFICIENTLY UTILIZING MEMORY BANDWIDTH

(75) Inventors: Sheng-Chun Niu, Tainan (TW); Ying-Ru Chen, Taipei (TW)

(73) Assignees: Himax Media Solutions, Inc., Tainan County (TW); Himax Technologies Limited, Tainan County (TW)

( * ) Notice: Subject to any disclaimer, the term of this patent is extended or adjusted under 35 U.S.C. 154(b) by 770 days.

(21) Appl. No.: 12/464,821

(22) Filed: May 12, 2009

(65) Prior Publication Data

US 2010/0289964 A1 Nov. 18, 2010

(51) Int. Cl.
*G06F 13/00* (2006.01)
*G06T 1/60* (2006.01)
(52) U.S. Cl. .................... 345/537; 345/530; 345/536
(58) Field of Classification Search ............... 345/530, 345/536, 537
See application file for complete search history.

(56) References Cited

U.S. PATENT DOCUMENTS

| | | | | |
|---|---|---|---|---|
| 4,564,915 A * | 1/1986 | Evans et al. | .................. | 345/550 |
| 5,611,038 A * | 3/1997 | Shaw et al. | .................. | 715/202 |
| 5,619,226 A * | 4/1997 | Cahill, III | .................. | 345/667 |
| 6,437,787 B1 * | 8/2002 | Wu | .................. | 345/519 |
| 6,529,244 B1 * | 3/2003 | Hrusecky | .................. | 348/453 |
| 2003/0151610 A1 * | 8/2003 | Kuriakin et al. | .................. | 345/589 |
| 2004/0100577 A1 * | 5/2004 | Linzer et al. | .................. | 348/383 |
| 2005/0243203 A1 * | 11/2005 | Swan | .................. | 348/448 |
| 2006/0088298 A1 * | 4/2006 | Frame et al. | .................. | 386/117 |
| 2006/0146939 A1 * | 7/2006 | Wang | .................. | 375/240.24 |
| 2006/0251323 A1 * | 11/2006 | MacKinnon et al. | .................. | 382/167 |
| 2009/0116554 A1 * | 5/2009 | Ma et al. | .................. | 375/240.16 |
| 2009/0140965 A1 * | 6/2009 | Ishiguchi et al. | .................. | 345/87 |
| 2010/0177241 A1 * | 7/2010 | Chen et al. | .................. | 348/451 |

* cited by examiner

*Primary Examiner* — David T Welch
(74) *Attorney, Agent, or Firm* — Stout, Uxa, Buyan & Mullins, LLP

(57) ABSTRACT

A memory access system and method for efficiently utilizing memory bandwidth is disclosed. A data arrangement unit arranges video data into at least a primary block and a supplemental block, which are then stored in a memory device. The video data are arranged such that the video data of the primary block stored in the memory device can be sequentially read by a device, thereby increasing efficiency in memory bandwidth usage and memory data access.

20 Claims, 2 Drawing Sheets

MEMORY ACCESS SYSTEM AND METHOD FOR EFFICIENTLY UTILIZING MEMORY BANDWIDTH

BACKGROUND OF THE INVENTION

1. Field of the Invention

The present invention generally relates to semiconductor memory devices, and more particularly to a video data arrangement in a memory device with efficient memory bandwidth usage and efficient memory data access.

2. Description of the Prior Art

Memory bandwidth is the rate at which data can be stored to or read from a semiconductor memory device, and is usually expressed as bytes per second. As the memory resource is usually precious in an electronic system in which the memory device or devices are shared among a variety of processors or devices, a lack of memory bandwidth is commonly experienced. One way to increase the memory bandwidth is to sequentially and continuously access an entire block of data during which the memory device is given exclusive access to a particular processor or device. For example, in a burst mode, as provided by some memory devices, a whole block of data can be transferred without interruption once the first access address and some required control signals are provided to the memory device. Nevertheless, the memory device is oftentimes accessed in a random manner with the required data being randomly stored into or read from distinct locations of the memory device. In this case, memory bandwidth usage can be inefficient owing to substantial time being wasted in providing access addresses and control signals during each data access.

The disadvantage of randomly accessing data of a memory device becomes even worse when the memory device is utilized as a video buffer (or frame buffer) for storing video data (particularly high-density video data) or when real-time image processing is involved.

For the reason that memory device bandwidths tend to be inefficient in video data access operations even to the extent of incapacitating real-time image applications, a need has arisen to propose a novel scheme for increasing the efficiency of such operations in memory devices.

SUMMARY OF THE INVENTION

In view of the foregoing, it is an object of the present invention to provide a memory access system and method for efficiently utilizing memory bandwidth without substantively sacrificing video quality.

According to one embodiment, a data arrangement unit arranges video data into at least a primary block and a supplemental block, which are then stored in a memory device. The video data are specifically arranged such that the arranged video data of the primary block stored in the memory device can be sequentially read out by a device or processor. In one embodiment, the data arrangement unit removes at least one chrominance component (such as a U or V component) of an adjacent two pixels while maintaining the luma component (such as a Y component), therefore resulting in the primary block.

DETAILED DESCRIPTION OF THE INVENTION

Figure 1:
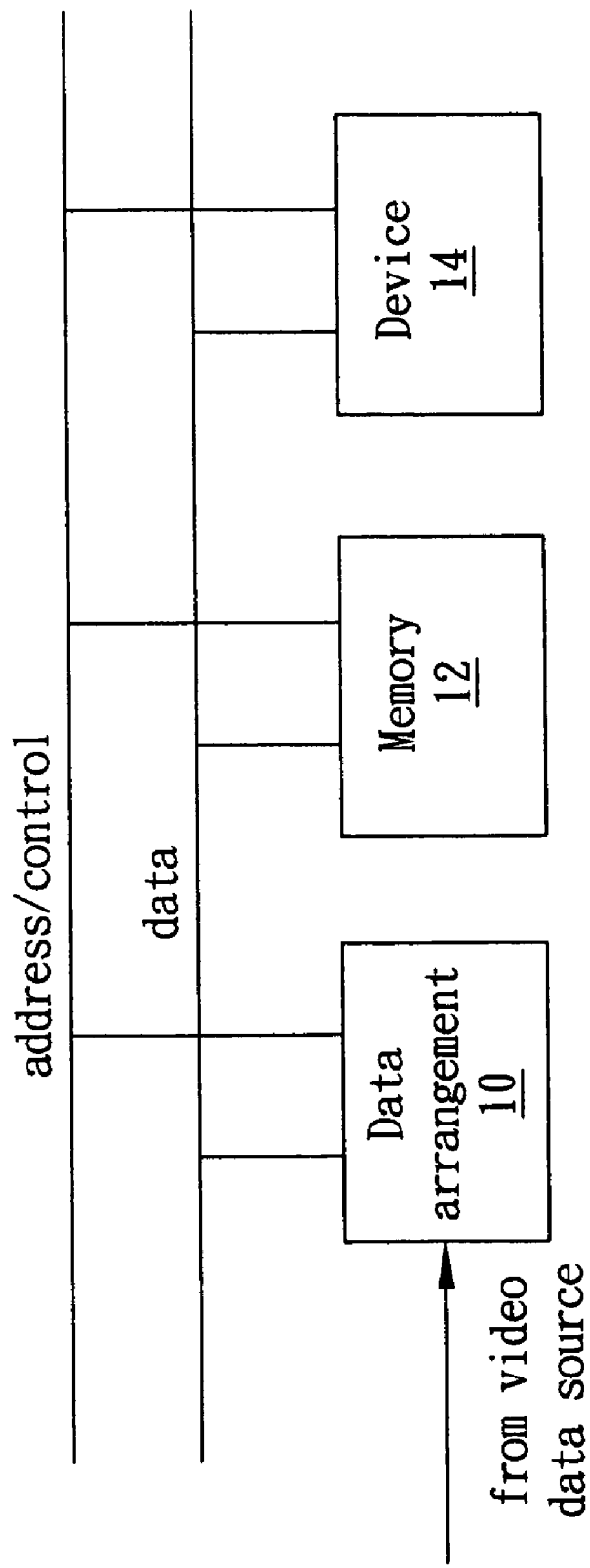
FIG. 1 shows a block diagram of a memory access system with efficient memory bandwidth usage according to one embodiment of the present invention.

Referring more particularly to the drawings, FIG. 1 shows a block diagram of a memory access system with efficient memory bandwidth usage according to one embodiment of the present invention. A data arrangement unit 10 receives video data from a video data source (not shown), and then rearranges the received video data into at least two blocks of video data, which may comprise a primary block and a supplemental block. The video data of the primary block are arranged in a specific way such that (a portion or entirety of) these video data can be later accessed sequentially and continuously, and the amount of video data can be accommodated with a given memory bandwidth without substantively sacrificing video quality. The video data of the supplemental block may be used to complement the video data of the primary block. In short, the primary block and the supplemental block together compose the whole video data received from the video data source. The arranged video data are subsequently written into a memory device 12 or devices, for example, via a data bus. Afterwards, a device 14 or processor may efficiently access or read the video data from the memory device 12, for example, via the data bus. As a consequence of the video data being specifically arranged and stored in the memory device 12, the data access can thus be performed in a sequential manner. Accordingly, the efficiency of the memory bandwidth usage can be increased and access time can be reduced, making real-time image applications (such as image scaling, de-interlacing or frame rate up conversion) feasible.

Figure 2:
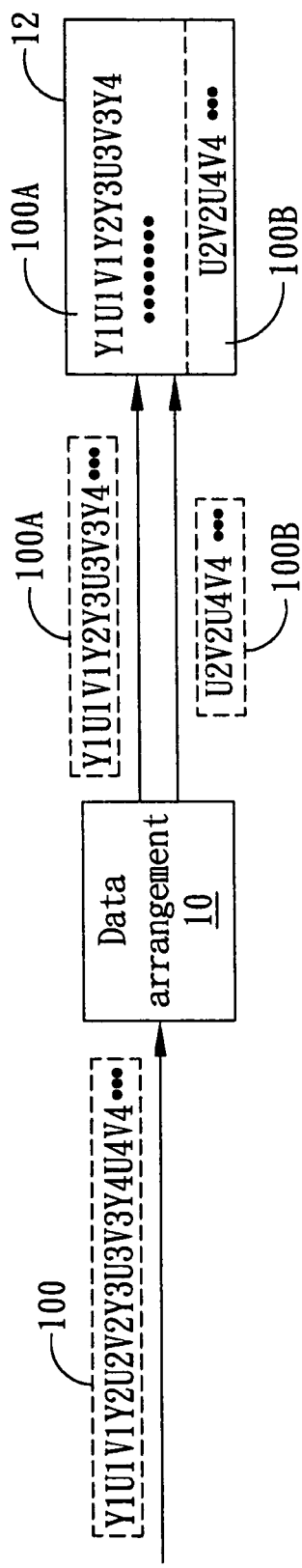
FIG. 2 exemplifies the data arrangement on a portion of video data.

In one embodiment, the video data from the video data source comprise a YUV color-space format, where Y stands for luma component (the brightness), and U and V stand for chrominance components (the color). The YUV format can have other similar alternatives, such as Y'UV, YCbCr and YPbPr. It is appreciated that although YUV color-space format is described in the embodiment, other color spaces may be well adapted for the present invention. FIG. 2 exemplifies the data arrangement on a portion of video data with YUV format. Specifically, the incoming video data 100, i.e., (Y1U1V1), (Y2U2V2), (Y3U3V3) and (Y4U4V4), respectively represent the components of the first pixel, the second pixel, the third pixel, and the fourth pixel. The data arrangement unit 10 rearranges the received video data 100 into two blocks of video data, namely, for instance, a primary block 100A and a supplemental block 100B. In the embodiment, the chrominance components (the color) Us and Vs of the even-number pixels are removed from the incoming video data 100, resulting in the primary block 10A. Generally speaking, at least one chrominance component of an adjacent two pixels is removed. The removed chrominance components (the color) Us and Vs compose the supplemental block 100B. The video data of the primary block 100A and the video data of the supplemental block 100B are respectively stored in the memory device 12 as shown. Afterwards, the memory device 12 can be efficiently accessed by a device 14 (FIG. 1) or processor.

In a first exemplary embodiment, only the primary block 100A in the memory device 12 is read (e.g., read out). The viewer typically does not perceive the missing chrominance components Us and Vs as these color components tend not to be sensitive to a common viewer. In a second exemplary embodiment, the missing chrominance components Us and Vs may be recovered by interpolation. For example, the missing U2V2 can be recovered by interpolation between the U1V1 and the U3V3. Generally speaking, the missing chrominance components can be recovered by interpolation between a preceding pixel and a succeeding pixel. In a third exemplary embodiment, the video data of the primary block 100A and the video data of the supplemental block 100B are read from the memory device 12 in turn. Alternatively, the video data may be read from the memory device 12 at the same time provided the memory device 12 possesses multi-port capability.

The criteria for selecting among one or more of the first through third exemplary embodiments may be based on the amount of available memory bandwidth, the allowable access time and the requirement of image quality. For example, when the memory bandwidth is not sufficient or a real-time application is involved, the first exemplary embodiment can or should be selected. In another example, when high image quality is required with insufficient memory bandwidth, the second exemplary embodiment can or should be selected.

Figure 3:
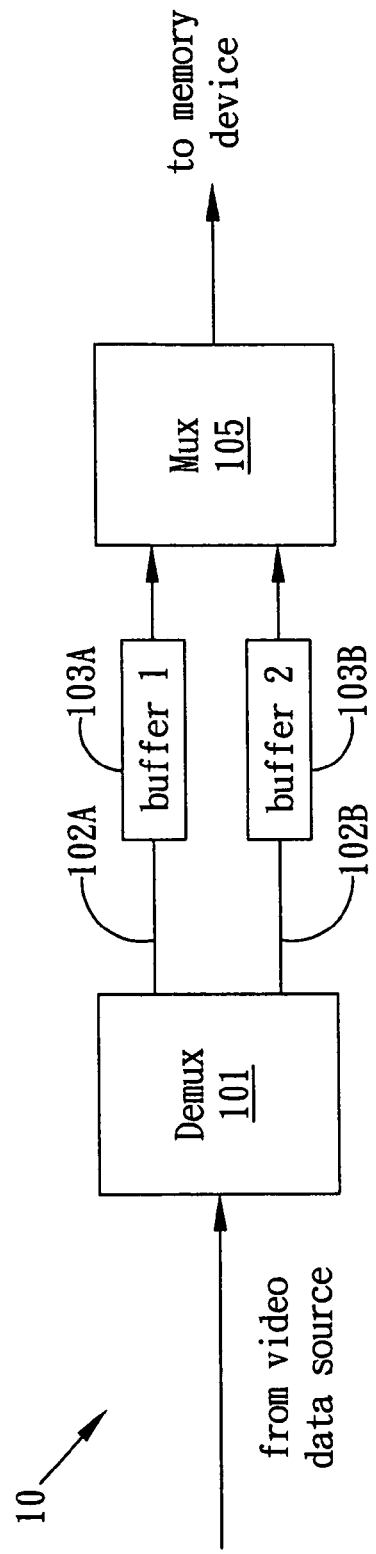
FIG. 3 shows a detailed block diagram of the data arrangement unit according to one embodiment of the present invention.

FIG. 3 shows a detailed block diagram of the data arrangement unit 10 according to one embodiment of the present invention. In the embodiment, a demultiplexer (Demux) 101 (or a controlled switch in general) receives video data from the video data source. The arranged video data (such as Y1U1V1Y2Y3U3V3Y4) are outputted via (e.g., from) the first output port 102A of the demultiplexer 101, and are then forwarded to a first buffer 103A. The removed video data (such as U2V2U4V4) are outputted via (e.g., from) the second output port 102B of the demultiplexer 101, and are then forwarded to a second buffer 103B. The video data of the first buffer 103A and the second buffer 103B are connected to a multiplexer (Mux) 105 (or a controlled switch in general), which selects the first buffer 103A and the second buffer 103B in turn, such that the video data of the first block 100A and the video data of the second block 100B can be respectively stored into the memory device 12.

Although specific embodiments have been illustrated and described, it will be appreciated by those skilled in the art that various modifications may be made without departing from the scope of the present invention, which is intended to be limited solely by the appended claims.

What is claimed is:

1. A memory access system for efficiently utilizing memory bandwidth, comprising:
   a data arrangement unit for arranging video data into at least a primary block and a supplemental block such that the primary block includes luma components of all pixels and only chrominance components of non-even number pixels, and the supplemental block includes only chrominance components of even number pixels; and
   a memory device in which the arranged video data of the primary block and the supplemental block are respectively and separately stored;
   wherein the video data are specifically arranged such that the arranged video data stored in the memory device are sequentially and continuously read by a device in an order of the pixels.

2. The system of claim 1, wherein the video data are provided by a video data source.

3. The system of claim 1, wherein the video data have YUV color-space format, wherein Y stands for luma component, and U and V stand for chrominance components.

4. The system of claim 3, wherein the data arrangement unit removes at least one chrominance component of an adjacent two pixels represented by the video data, while maintaining luma components of the pixels.

5. The system of claim 3, wherein the components U and V of even-number pixels are removed, resulting in the primary block.

6. The system of claim 5, wherein the removed components U and V compose the supplemental block.

7. The system of claim 4, wherein a missing chrominance component caused by the removal is recovered by interpolation between a preceding pixel and a succeeding pixel.

8. The system of claim 1, wherein, the primary block and the supplemental block are read from the memory device in turn.

9. The system of claim 1, wherein the primary block and the supplemental block are read at the same time.

10. The system of claim 1, wherein the data arrangement unit comprises:
    a demultiplexer from which the video data of the primary block are outputted via a first output port of the demultiplexer, and the video data of the supplemental block are outputted via a second output port of the demultiplexer;
    a first buffer and a second buffer for respectively storing the video data from the first output port and the second output port; and
    a multiplexer which receives the video data of the first buffer and the video data of the second buffer in turn, which are then stored into the memory device.

11. A memory access method for efficiently utilizing memory bandwidth, comprising:
    arranging video data into at least a primary block and a supplemental block such that the primary block includes luma components of all pixels and only chrominance components of non-even number pixels, and the supplemental block includes only chrominance components of even number pixels; and
    storing the arranged video data of the primary block and the supplemental block respectively and separately in a memory device;
    wherein the video data are specifically arranged such that the arranged video data stored in the memory device are sequentially and continuously read by a device in an order of the pixels.

12. The method of claim 11, wherein the video data are provided by a video data source.

13. The method of claim 11, wherein the video data have a YUV color-space format, wherein Y stands for luma component, and U and V stand for chrominance components.

14. The method of claim 13, wherein the step of arranging the video data comprises:
    removing at least one chrominance component of an adjacent two pixels represented by the video data., while maintaining luma components of the pixels.

15. The method of claim 13, wherein the components U and V of even-number pixels are removed, resulting in the primary block.

16. The method of claim 15, wherein the removed components U and V compose the supplemental block.

17. The method of claim 14, wherein missing a chrominance component caused by the removal is recovered by interpolation between a preceding pixel and a succeeding pixel.

18. The method of claim 11, wherein the primary block and the supplemental block are read from the memory device in turn.

19. The method of claim 11, wherein the primary block and the supplemental block are read at the same time.

20. The method of claim 11, wherein the step of arranging the video data comprises:

demultiplexing the video data to generate the primary block and the supplemental block;

respectively buffering the video data of the primary block and the video data of the supplemental block;

multiplexing the buffered video data of the primary block and the buffered video data of the supplemental block in turn; and storing the multiplexed video data of the primary block and the multiplexed video data of the supplemental block into the memory device.

* * * * *